Aug. 25, 1953 E. C. FREEMAN 2,649,801
APPARATUS FOR FISHING THROUGH ICE
Filed May 22, 1951 2 Sheets-Sheet 1
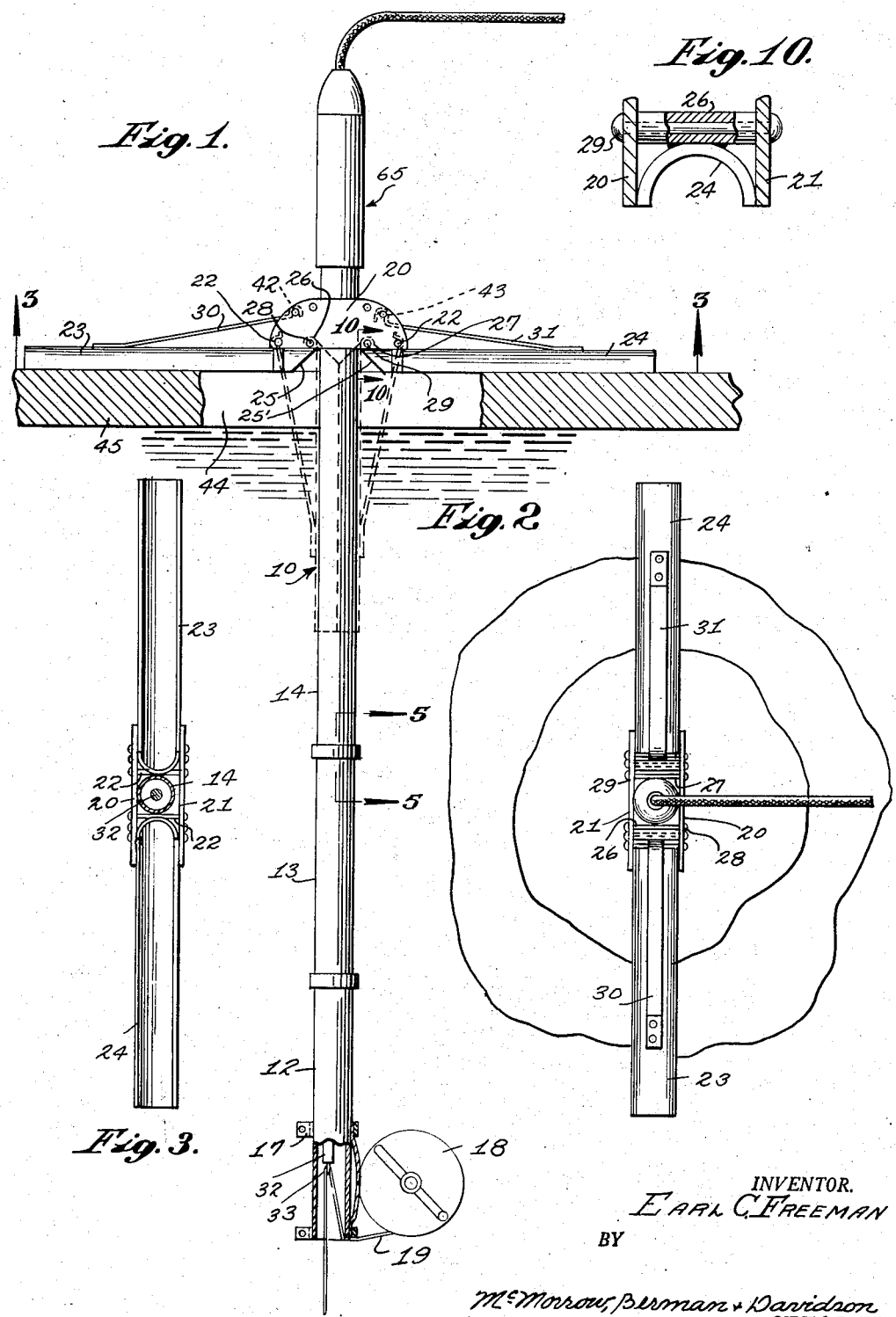
INVENTOR.
EARL C. FREEMAN
BY
McMorrow, Berman & Davidson
ATTORNEYS

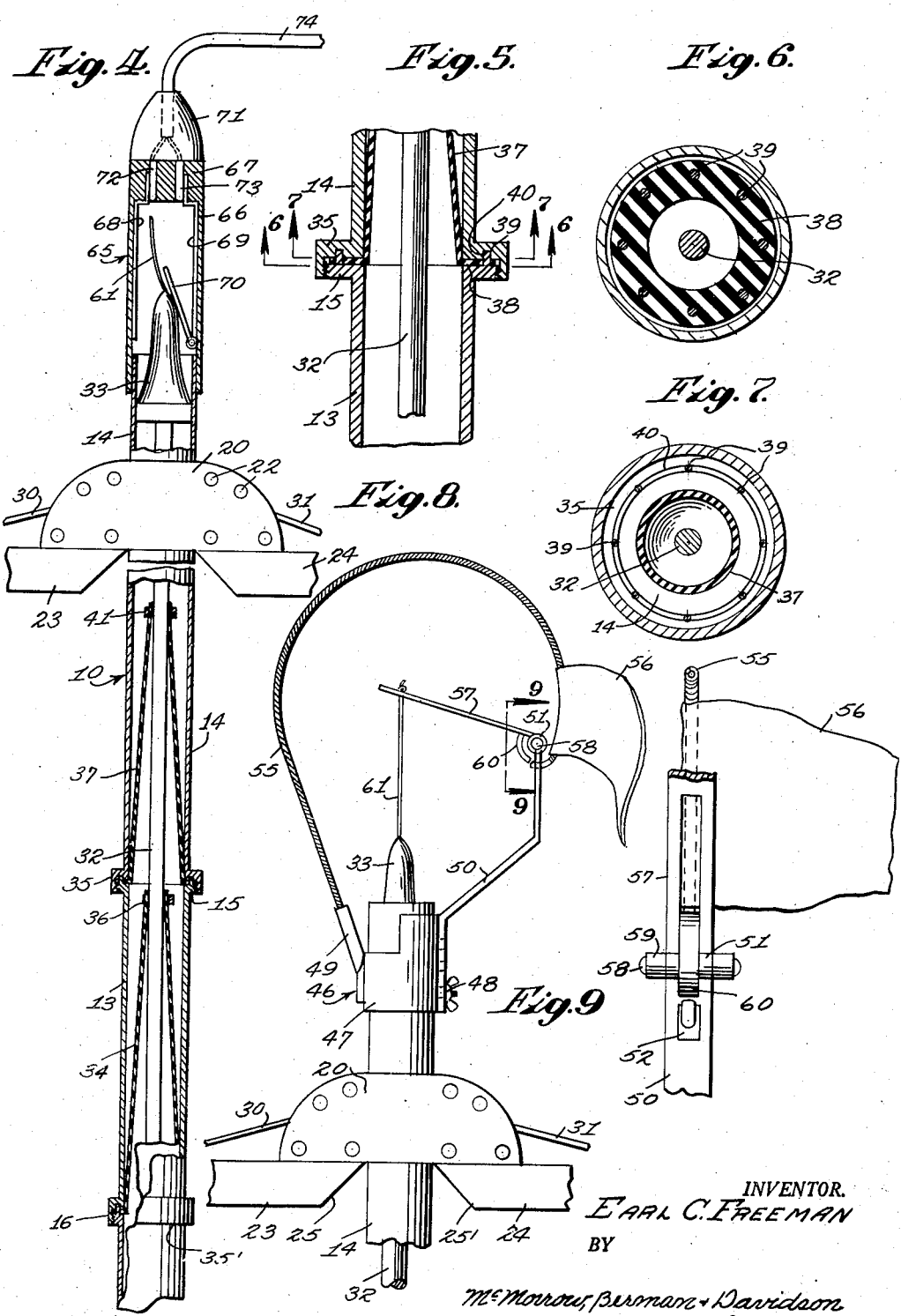

Patented Aug. 25, 1953

2,649,801

UNITED STATES PATENT OFFICE 2,649,801

APPARATUS FOR FISHING THROUGH ICE

Earl C. Freeman, Milwaukee, Wis.

Application May 22, 1951, Serial No. 227,579

4 Claims. (Cl. 43—17)

This invention relates to ice fishing equipment, and more particularly to equipment for supporting a fishing line in a non-freezing position below ice covering a body of water and providing a signal above the ice.

It is among the objects of the invention to provide improved ice fishing equipment which can be mounted on ice covering a body of water and extended through a hole in the ice to support a fishing line and reel in the water below the ice where the line and reel will not freeze, and which provides a signal disposed above the ice and connected to the line to indicate a strike by a fish; which protects the connection between the line and the signal device against freezing, so that the signal device will always operate freely and the line can be freely taken off by a hooked fish; which provides selectively usable signal heads, one of which provides a signal visible at a distance in the daytime and another of which provides a light signal visible at night; which can be folded to a compact condition for transportation and storage; and which is simple and durable in construction, economical to manufacture and effective and efficient in operation.

Other objects and advantages will become apparent from a consideration of the following description and the appended claims in conjunction with the accompanying drawings, wherein:

Figure 1 is a side elevational view of ice fishing equipment illustrative of the invention shown mounted in operative position on ice covering a body of water;

Figure 2 is a top plan view of the ice fishing equipment illustrated in Figure 1;

Figure 3 is a transverse cross-sectional view on the line 3—3 of Figure 1, looking in the direction of the arrows;

Figure 4 is a longitudinal cross-sectional view, with parts broken away;

Figure 5 is a fragmentary longitudinal cross-sectional view on the line 5—5 of Figure 1;

Figure 6 is a transverse cross-sectional view on the line 6—6 of Figure 5;

Figure 7 is a transverse cross-sectional view on the line 7—7 of Figure 5;

Figure 8 is a side elevational view of the upper portion of the ice fishing equipment showing a signal head different from the signal head illustrated in Figures 1 and 4; and Figure 9 is a fragmentary cross-sectional view on an enlarged scale on the line 9—9 of Figure 8.

With continued reference to the drawings, the signal device comprises an elongated, tubular structure, generally indicated at 10, and comprising interconnected sections, as indicated at 12, 13 and 14.

As is particularly illustrated in Figure 4, the section 13 has an outwardly projecting annular flange 15 on its upper end, said flange having peripheral screw threads thereon, and the section 14 has on its lower end an internally screw-threaded, annular socket 35 which receives the flange 15 to secure the sections 13 and 14 together in end-to-end relation and the section 13 is provided with an internally screw-threaded socket 35' at its lower end which receives the peripherally threaded flange 16 on section 12 to secure the sections 12 and 13 together in end-to-end relationship.

The sections 12 and 13 may be of substantially the same length and the upper section 14 is longer than the sections 12 and 13. Suitable clamps 17 extend around the lower portion of the section 12 at spaced apart locations therealong, and secure a fishing line reel 18 of known construction to this bottom section, so that the reel is disposed at the side of the section and extends outwardly therefrom. A fishing line 19 is wound on the reel and extends therefrom, carrying a suitable baited hook, not illustrated, at its end.

A pair of plates 20 and 21 are mounted on the upper section 14 of the tubular structure at respectively opposite sides of this section and near the end of the section 14 remote from the section 13. These plates are disposed in substantially parallel relationship to each other and extend at their ends outwardly of the section 14 at respectively opposite sides of this section. Pins, as indicated at 22, extend transversely of the space between the plates 20 and 21 and are secured at their ends in these plates at locations spaced apart along the upper and outer edges of the plates, the pins being divided into two series disposed one series at each of two opposite sides of the section 14 with the pins spaced apart in a manner to be presently described. Arms 23 and 24 of semicircular cross-sectional shape are disposed at respectively opposite sides of the section 14 and hingedly connected, each at one end, to the plates 20 and 21 at the corresponding sides of the tubular section. The ends of the arms connected to the tubular section are beveled off, as indicated at 25 and 25', and tubular sleeves 26 and 27 are secured to the arms 23 and 24, respectively, on the convex sides of the arms and at the beveled ends thereof. These sleeves are disposed substantially at right angles to the longitudinal center lines of the corresponding arms, and extend transversely across the space between the plates 20 and 21 near the lower edges of the plates and adjacent the corresponding sides of the section 14, and pivot pins 28 and 29 extend through the sleeves 26 and 27, respectively, and through registering apertures in the plates 20 and 21 to hingedly connect the arms 23 and 24 to the tubular section 14 for movement of the arms between a folded position in which the arms extend along the tubular section, as indicated in dotted lines in Figure 1, and a position in which the arms project radially outwardly from the tubular section 14 in respectively opposite directions and substantially perpendicular to the tubular section, as illustrated in full lines in Figures 1 and 2.

Leaf springs 30 and 31 are secured to the arms 23 and 24, respectively, each at one end, at a location intermediate the length of the corresponding arm, and each of these springs has on its free end a hook formation selectively engageable with the pins 22 to hold the arms in selected positions of angular adjustment relative to the tubular structure 10.

A rod 32 extends longitudinally of the tubular structure 10 and is longitudinally movable therein. A signal bobber 83 is secured on the end of the rod 32 at the end of the tubular structure adjacent the plates 20 and 21, and this signal bobber is movable by the rod between a position in which it is disposed entirely within the upper end portion of the section 14 of the tubular structure and a position in which it projects above the upper end of the tubular structure. The other end of the rod is disposed inwardly of the outer or bottom end of the section 12 of the tubular structure, and a line eye 33 is secured to this end of the rod. The fishing line 19 is slidably received in the eye 33, so that a pull on the line will exert a downward pull on the rod 32.

A sealing diaphragm 34 formed of flexible, water impervious material and in the form of an elongated, partly conical sleeve is disposed within the section 13 of the tubular structure, and has at its larger end an outwardly extending, annular flange which is clamped between the flange formation 35' on the upper end of the section 12 and the socket formation 16 on the lower end of the section 13. This diaphragm extends longitudinally of the section 13 from the lower end of this section to a location near the upper end of the section, and at its upper end it is firmly clamped to rod 32 by suitable means, such as the clamp band or wire 36.

The flange of this diaphragm is provided with angularly spaced apart apertures, and the flange 16 of section 12 is provided on its face engaging the diaphragm flange with angularly spaced, apart pins received one in each diaphragm flange aperture to hold the diaphragm flange in place on the flange 16, and the socket 35' has an annular groove in its bottom surface receiving the outer end portions of the pins.

A second diaphragm 37 in the form of an elongated, tapered sleeve is disposed in section 14 and has at its larger end an outwardly projecting flange 38 clamped between the top surface of flange 15 on section 13 and the bottom wall of socket 35 on the lower end of section 14. This flange 38 has a circular series of apertures angularly spaced apart around the flange thereof, and flange 15 of section 13 carries on its end surface a series of pins 39 which extend through corresponding apertures in the flange 38 of the diaphragm and are received in a groove 40 provided in the bottom wall of socket 35. These pins 39 maintain the diaphragm flange 38 securely clamped between the adjacent ends of the sections 13 and 14 of the tubular structure. The diaphragm 37 extends longitudinally of section 14, from the bottom end of this section to a location intermediate the length of the section and is clamped at the upper end to the rod 32 by suitable means, such as the clamp wire or clamp band 41. The diaphragm 37 and the connection of its flange between the adjoining ends of sections 13 and 14 is similar in all respects to the diaphragm 34 and the connection of its flange between the adjoining ends of sections 12 and 13.

The diaphragms 34 and 37, while permitting longitudinal movement of the rod 32 in the tubular structure will prevent water from rising in the tubular structure above the level of the water in which the lower portion of the tubular structure is submerged, so that no water can freeze in the space between the rod and the tubular structure to impede movements of the rod.

In the use of the device as above described, with the tube sections assembled together and with the diaphragms in the indicated manner, and with the rod extending through the tubular structure and carrying the signal bobber at one end of the tubular structure, the fishing line is passed through the eye or hook 33 and baited, a length of line being left depending from the eye 33 in accordance with the depth of the water in which the device is to be used. The arms 23 and 24 are moved outwardly until they extend substantially perpendicular to the tubular structure, and are releasably locked in this position by engaging the hook formations 42 and 43 on the free ends of the springs 30 and 31 with the proper pin 22. The tubular structure at the sides of the arms 23 and 24 adjacent the reel 18 is then inserted through a fishing hole 44 in an ice layer or formation 45 on a body of water in which the fishing is to be done. The arms will rest on the ice at the sides of the fishing hole 44, and the tubular structure will be suspended from the arms in substantially vertical position with the greater part of its portion below the arms submerged in the water, and with water excluded by the diaphragms from the space between rod 32 and the tubular structure. Rod 32 is now positioned so that the signal bobber extends above the upper end of the tubular structure, the rod being supported in this position by the flexible diaphragms. When the hook carried by the fishing line 19 is struck by a fish, the pull on the line will pull the rod 32 downwardly and pull the signal bobber into the upper end portion of the tubular structure, the disappearance of the bobber indicating to the fisherman that the hook has been struck. The entire device may now be lifted from the ice until the reel is brought to position above the ice for reeling in the fish. While the reel and line are disposed in the water below the ice, the line and reel will not freeze and the hooked fish may take the line off of the reel against the resistance of the reel only and will not break the line.

If a fisherman desires to use several devices at the same time and to operate them from a distance, the tip-up signal head, generally indicated at 46 and particularly illustrated in Figures 8 and 9, may be used to provide a signal visible from a distance to indicate when a fish has been taken by the device. This signal head comprises a sleeve 47 which receives the upper end portion of the upper section 14 of the tubular structure 10 and is secured thereon by a suitable means, such as the set screw 48. A tubular socket 49 is secured at one end to the sleeve and extends upwardly from the sleeve and outwardly of the tubular structure when the signal head is operatively mounted on the latter. An arm 50 is secured at one end to the sleeve 47 at a location substantially diametrically opposite the socket 49 and also extends upwardly from the sleeve and outwardly of the tubular structure. This arm has a hinge eye 51 on its end remote from the sleeve 47 and adjacent the hinge eye is provided with an aperture 52. A flagpole 55, preferably in the form of an elongated coil spring, has one end secured in the socket 49, and a flag 56 is carried by this pole near its other end.

A trigger lever 57 is hingedly connected at one end by a hinge pin 58 which extends through the hinge eye 51 and through hinge eyes or lugs 59 on the corresponding ends of the levers 57 and disposed one in each side of the eye 50. In order to set this signal device, the free end of the pole 55 is inserted through the aperture 52 in the arm 50 and engaged therein. The lever 57 has an extension 60 thereon near its end pivotally connected to the arms 50 and this lever is connected at its other end to the bobber 38 by a cord 61. When the rod 32 drops pulling the bobber 38 inwardly of the section 14 of the tubular structure, the bobber pulls downwardly on the cord 61 and on the corresponding end of the lever 57. This forces the distal end of the lever extension 60 against the end of the pole 55 engaged in the aperture 52 and forces this end of the pole out of the aperture freeing the pole so that it jerks to an upright position and raises the flag 56. This raising of the flag 56 indicates to the fisherman that the hook associated with the device has been struck by a fish.

When it is desired to use the device for fishing at night or at other times when it is not easy to observe the flag or bobber signals, the electric signal head, generally indicated at 65 and illustrated in Figures 1 and 4, may be used. This signal head comprises an elongated cylindrical body 66 having one end open and having an end wall 67 closing its other end. The open end of the body 66 receives the upper end portion of the tube section 14 to support the head in upright position on the tubular structure, and a pair of elongated strips 68 and 69 extend longitudinally of the interior of the hollow body at diametrically opposite sides thereof and have their ends received in openings provided in the end wall 67. These conductors 68 and 69 terminate short of the open end of the cylindrical body and a switch arm 70 is pivotally connected at one end to the conductor 69 at the end of this conductor remote from the end wall 67. The switch arm 70 has a length such that, when free, it will extend across the tubular body 66 and contact the conductor 68 to complete a circuit between these conductors. The openings in the end wall in which the ends of the conductors are received extend through the end wall and an extension cord plug 71 has its prongs 72 and 73 received in these openings and respectively in electrically conducting engagement with the conductors 68 and 69. A two-wire extension cord 74 extends from the plug 71 to a suitable visual or audible signal device, such as a lamp or a bell or buzzer.

When the device is set, the bobber 33 engages the switch arm 70 and holds this switch arm up out of engagement with the contact strip 68, as is particularly illustrated in Figure 4. When the rod 32 is dropped by the pull of a fish on the fishing line 19, the bobber is pulled down releasing the switch lever to bridge the space between the contact strips 68 and 69 and complete the signal circuit 30.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. Ice fishing equipment comprising a tubular structure adapted to be supported in upright position in a hole in ice covering a body of water with one end above and its other end below the ice, means secured to said tubular structure near said one end thereof for supporting said tubular structure on ice, a rod extending through said tubular structure and longitudinally movable therein, flexible means providing a fluid seal between said rod and said tubular structure near said other end of the latter, a signal bobber on said rod at said one end of the tubular structure and movable into and out of the latter by movement of said rod, means at the other end of said rod for connecting a fishing line thereto, said bobber being movable into said tubular structure in response to the pull of a fishing line on said rod, and a signal head secured on said tubular structure at said one end thereof and actuated by said bobber, said signal head comprising a sleeve receiving said tubular structure at said one end thereof, a flexible pole secured at one end to said sleeve, a flag secured to said pole near the other end thereof, an arm secured at one end to said sleeve and engageable at its other end with said other end of the pole to hold the latter in a bowed condition, a trigger lever pivotally mounted on said arm and engageable with said pole to free the latter from said arm, and means connecting said bobber to said trigger lever.

2. Ice fishing equipment comprising an elongated tubular structure, a pair of plates at opposite sides of and mounted on said tubular structure, elongated concave arms hingedly connected each at one end to said plates near one end of the latter and movable between a folded position in which they extend along and receive said tubular structure and an extended position in which they project radially of said tubular structure with their concave portions facing downwardly to rest on the surface of ice around a hole in which said tubular structure is positioned to support the tubular structure, resilient strut means acting between said arms and said tubular structure and being arranged to support the former in selected positions relative to the latter, a rod extending through said tubular structure, an elongated diaphragm of flexible material connected between said rod and said tubular structure near the other end of the latter and providing a water-tight seal therebetween, a signal bobber on the end of said rod at said one end of said tubular structure and movable by said rod into and out of said tubular structure, a reel mounted on said tubular structure at said other end thereof, a fishing line wound on said reel and extending therefrom, and an eye secured to said rod at the end thereof adjacent said other end of the tubular structure and slidably receiving said line, said eye being disposed inwardly of said other end of the tubular structure so that a pull on said line will move said rod to pull said bobber into said tubular structure at said one end of the latter.

3. Ice fishing equipment comprising a tubular structure adapted to be supported in an upright position in a hole in ice covering a body of water with one end above and its other end below the ice, a pair of plates at opposite sides of and mounted on said tubular structure, a pair of elongated concave arms pivotally secured to opposite sides of said plates near said one end thereof for supporting said tubular structure on ice, said arms being foldable at times to positions receiving said tubular structure, a rod extending through said tubular structure and longitudinally movable therein, flexible means providing a fluid seal between said rod and said tubular structure near said other end of the latter, a signal bobber on said rod at said one end of said tubular structure and movable into and out of the latter by movement of said rod, means at the other end of said rod for connecting a fishing line thereto, said bobber being movable into said tubular structure in response to the pull of a fishing line on said rod, and respective resilient struts secured to said arms and being arranged to lockingly engage selected pins carried by said plates to secure the arms in selected extended positions relative to the tubular structure.

4. Ice fishing equipment comprising a tubular structure adapted to be supported in an upright position in a hole in ice covering a body of water with one end above and its other end below the ice, a pair of plates at opposite sides of and mounted on said tubular structure, respective arms pivotally secured to said plates near said one end thereof for supporting said tubular structure on ice, respective resilient strut elements secured to said arms and engageable with selected pins carried by said plates to secure said arms in selected supporting positions, a rod extending through said tubular structure and longitudinally movable therein, flexible means providing a fluid seal between said rod and said tubular structure near said other end of the latter, a signal bobber on said rod at said one end of the tubular structure and movable into and out of the latter by movement of said rod, means at the other end of the rod for connecting a fishing line thereto, said bobber being movable into said tubular structure in response to the pull of a fishing line on said rod, and a signal head secured on said tubular structure at said one end thereof and actuated by said bobber.

EARL C. FREEMAN.

References Cited in the file of this patent

UNITED STATES PATENTS

| Number | Name | Date |
|---|---|---|
| 1,173,827 | Marsh | Feb. 29, 1916 |
| 2,198,286 | Krivutza | Apr. 23, 1940 |
| 2,425,825 | Philips | Aug. 19, 1947 |
| 2,439,451 | Clark | Apr. 13, 1948 |
| 2,564,065 | Jaden | Aug. 14, 1951 |